Dec. 4, 1928.
C. BARBIERI
1,693,883
DISPENSER AND METHOD OF USE
Filed July 12, 1926   3 Sheets-Sheet 1
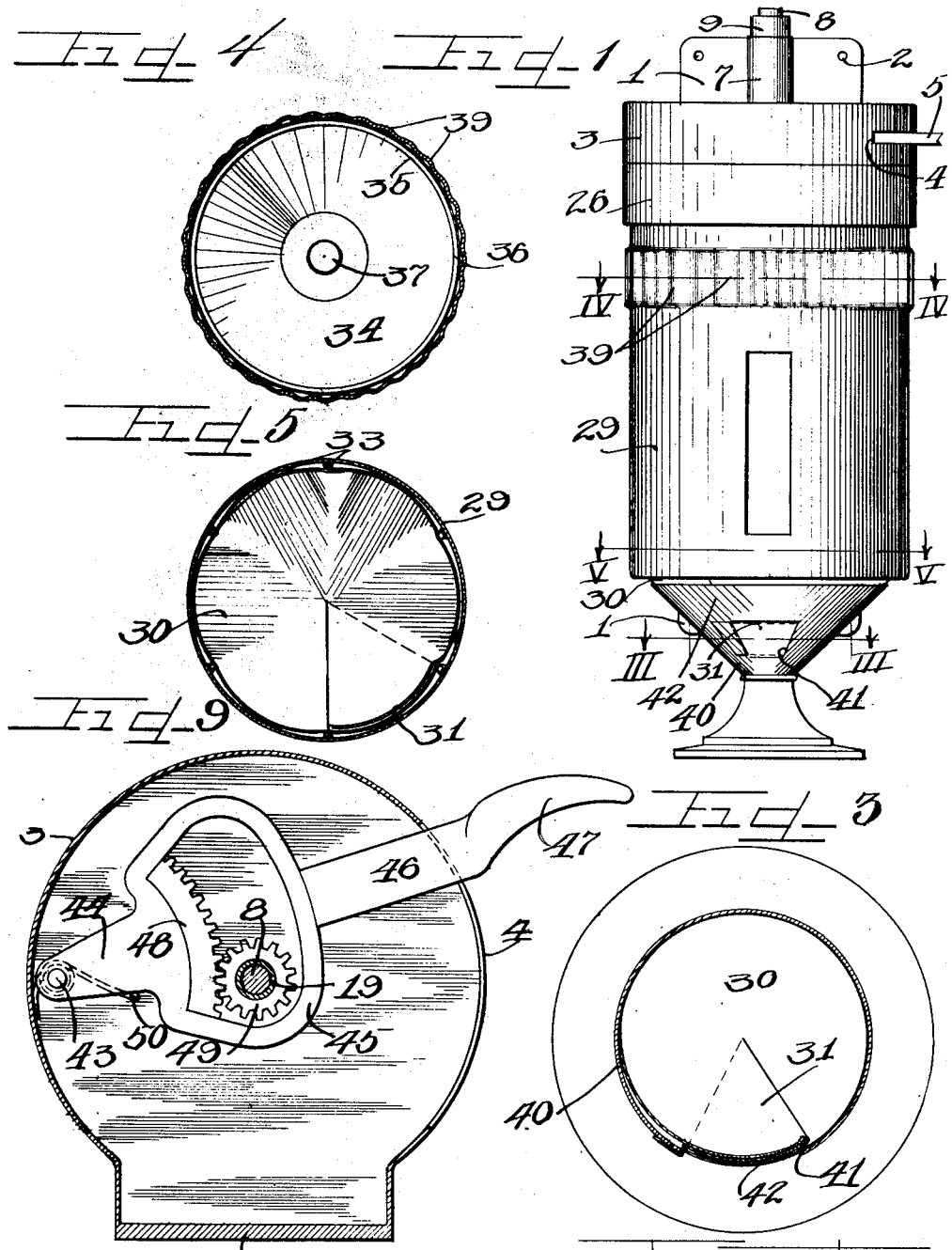
Inventor
Cesare Barbieri
by Charles Miller
Attys.

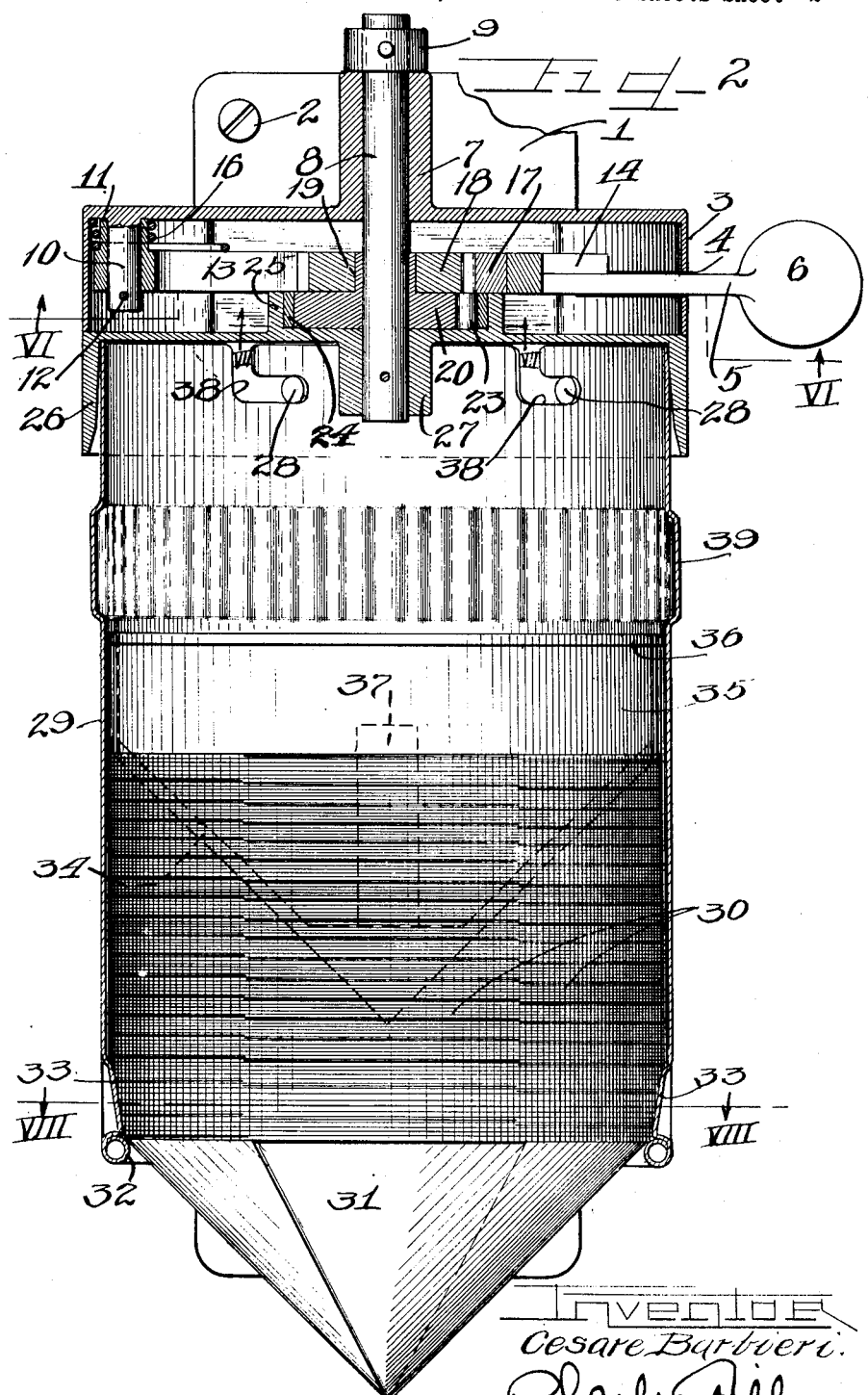

Dec. 4, 1928.
C. BARBIERI
1,693,883
DISPENSER AND METHOD OF USE
Filed July 12, 1926     3 Sheets-Sheet 3
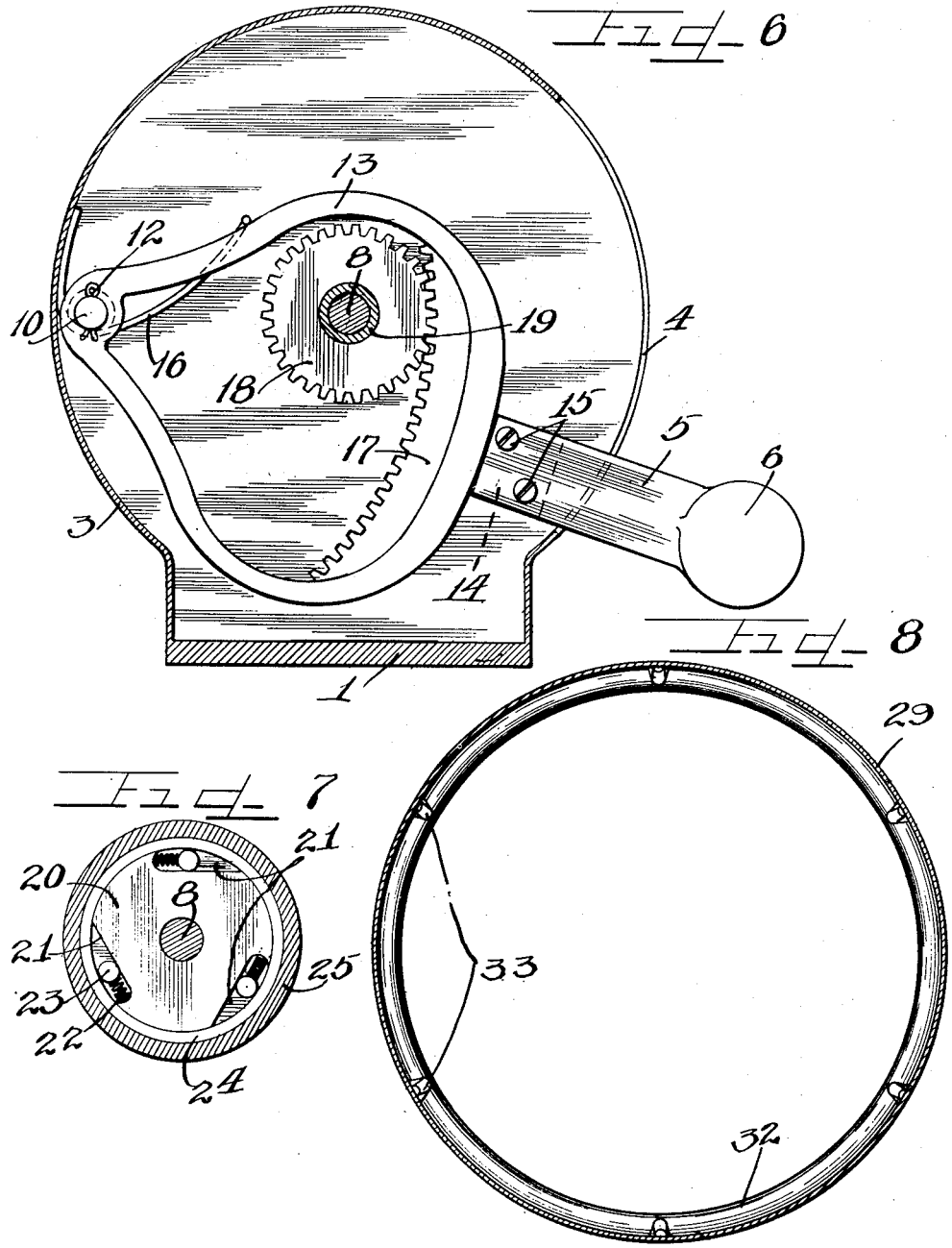
Inventor
Cesare Barbieri.
by Charles ...
Attys.

Patented Dec. 4, 1928.

1,693,883

UNITED STATES PATENT OFFICE.

CESARE BARBIERI, OF NEW YORK, N. Y., ASSIGNOR TO THE VORTEX MFG. CO., A CORPORATION OF ILLINOIS.

DISPENSER AND METHOD OF USE.

Application filed July 12, 1926. Serial No. 121,849.

This invention relates to an improved type of dispenser and more particularly to a sundae dish dispenser and the novel method of operation and use thereof.

It is an object of this invention to provide a sundae dish dispenser adapted to be used in combination with a sundae dish holder to effect a positive removal of sundae dishes from the dispenser one at a time.

It is also an object of this invention to provide a dispenser for sundae dishes, said dispenser adapted to be operated relative to a dish holder to permit a single sundae dish to be removed from the dispenser.

It is a further object of this invention to provide a dispenser wherein a container for a stack of sundae dishes is adapted to be rotated to effect the removal of sundae dishes therefrom.

It is furthermore an object of this invention to provide a sundae dish dispenser having a rotatable container for carrying a stack of sundae dishes with the lowermost sundae dish projecting from the container to permit a dish holder to engage over the same to effect a positive removal of the lowermost sundae dish when the container is rotated relative to said dish holder.

Another object of the invention is the providing of an improved method whereby sundae dishes are adapted to be removed one at a time from a dispenser by holding a dish holder in a substantially stationary position and then rotating the dish container relative to said holder to permit a folded portion of the lowermost dish in the container to be frictionally engaged with a tongue on said holder to permit said lowermost dish to be withdrawn as the holder is moved away from said dispenser.

It is a further object of this invention to provide a method for removing sundae dishes one at a time from a sundae dish container by moving the container and the dishes therein with respect to a dish holder which is held so that a folded portion of the the lowermost dish in the container is adapted to be slidably engaged beneath a tongue formed on the dish holder to facilitate the removal of said lowermost dish as the holder is moved away from the container.

It is an important object of this invention to provide a sundae dish dispenser adapted to be mounted on a stationary support and having a rotatable container for holding a stack of nested dishes with the lowermost dish in the stack projecting from the container so that when the container is rotated with respect to a dish holder projected against the lowermost dish removal of said dish from the container is readily accomplished.

Other and further important objects of this invention will be apparent from the disclosures in the specification and the accompanying drawings.

This invention (in a preferred form) is illustrated in the drawings and hereinafter more fully described.

On the drawings:

Figure 1 is front elevation of a dispenser embodying the principles of this invention illustrating a dish holder in coacting relation with the lowermost dish in the dispenser.

Figure 2 is an enlarged longitudinal section of the dispenser showing parts in elevation with a container holding a stack of nested sundae dishes.

Figure 3 is an enlarged transverse detail section taken on line III—III of Figure 1, to illustrate the coacting relationship between a sundae dish and the dish holder.

Figure 4 is a transverse sectional view taken on line IV—IV of Figure 1.

Figure 5 is a transverse section taken on line V—V of Figure 1.

Figure 6 is a transverse section of the upper portion of the dispenser taken on line VI—VI of Figure 2.

Figure 7 is a detail section taken on line VII—VII of Figure 2 illustrating the clutch mechanism.

Figure 8 is a section taken on line VIII—VIII of Figure 2 with the sundae dishes removed.

Figure 9 is a transverse section similar to that illustrated in Figure 6 but covering a modified form of the operating mechanism.

As shown on the drawings:

The improved sundae dish dispenser comprises a metal mounting plate 1 provided with corner apertures to receive mounting screws 2 for holding the plate 1 rigidly secured in position upon a wall or other suitable support.

Integrally formed transversely of the upper portion of the mounting plate 1 is a cylindrical housing or casing 3 open at its lower end. Provided in one side of the side wall of the case 3 is an arcuate guide slot 4 through which an operating handle or lever 5 projects. The outer end of the lever 5 is provided with a ball handle 6. Integrally formed, centrally upon the top of the stationary casing 3 is a sleeve or collar 7 which affords a bearing for a vertical shaft 8 which projects downwardly through the casing as per the illustration in Figure 2.

Pinned or otherwise secured upon the upper end of the shaft 8 is a retaining collar 9. Integrally formed upon the inner face of the top wall of the stationary casing 3 is a downwardly projecting stub shaft 10 on which a sleeve 11 is pivotally mounted. The sleeve is held in place by means of a cotter pin 12 or other suitable means. The sleeve 11 is integrally formed on one end of a yoke or frame 13, the other end of which has a shoulder or projection 14 integrally formed thereon to which the inner end of the lever 5 is rigidly secured by means of screws 15 or other suitable means. Engaged around the sleeve 11 is a control spring 16 one end of which is engaged against the inner face of the side wall of the casing 3 while the other end of said spring is engaged against one side of the pivoted yoke 13 to normally hold the yoke and the sleeve 5 in an operating position with said lever seated in one end of the guide slot 4.

Mounted within the enlarged end of the yoke or frame 13 is a gear segment or rack 17 the teeth of which are in mesh with a gear 18. The gear 18 is engaged around the shaft 8 and is separated therefrom by means of a sleeve 19 which surrounds the shaft 8 and is integrally formed on the upper face of a clutch disc 20. The outer margin of the clutch disc 20 is provided with a plurality of pockets or notches 21 each of which encloses a spring 22 and a clutch pin or cylinder 23. The clutch pins 23 are positioned to have frictional rolling contact with the inner peripheral surface of a steel bearing ring 24 which is rigidly secured within a ring or collar 25. The collar 25 is integrally formed upon the upper surface of a rotatable cover or head 26 which is positioned to close the lower opening end of the casing or housing 3. The head 26 is provided with an axial sleeve or collar 27 which is rigidly secured by means of a pin or other suitable means on the lower projecting end of the shaft 8. Rigidly secured at intervals on the inner surface of the side wall of the cover or head 26 are a plurality of studs or pins 28.

A cylindrical casing or container 29 constructed of metal or other suitable material is provided for holding a stack of nested sundae dishes 30. Each of the sundae dishes is formed with a folded portion 31. The stack of sundae dishes are disposed within the container 29 with the lowermost dish projecting through the open bottom of said container, and seated on a retaining ring 32 formed on the inner side of the lower end of the container 29. The stack of sundae dishes positioned within the container 29 is adapted to seat or rest upon a plurality of spaced ribs 33 disposed circumferentially within the lower portion of the container with the lower ends of said ribs wider than the upper ends, thereby affording a restricted passage or seat for the stack of sundae dishes. Removably disposed within the container 29 and seated within the uppermost dish in the stack is a weight or conical follower 34 the upper end of which terminates in a cylindrical wall or sleeve 35 provided with a flange or bead 36. Axially formed within the conical follower is an upwardly projecting stem or handle 37 provided for the purpose of facilitating handling of the follower. The follower acts to hold the stack of sundae dishes properly seated within the container and serves as a means for feeding the sundae dishes downwardly by gravity through the container each time a sundae dish is removed therefrom.

The upper end of the container 29 is provided with a plurality of bayonet slots 38 adapted to coact with the pins 28 to hold the container 29 properly associated with the cover or head 26, thereby rotatably supporting the container 29 in position below the casing 3.

Formed circumferentially around the upper portion of the container 29 are a plurality of longitudinally disposed ribs or corrugations 39 to afford a means for manually gripping the container and rotating the same by hand as hereinafter more fully described. The corrugated portion of the container provides a modified mean for operating the container in case the lever 5 is dispensed with.

Referring to Figure 1 a conical sundae dish holder 40 is shown in coacting relation with the dispenser. The conical sundae dish holder is provided with an opening 41 and with a resilient tongue 42, disposed within the dish holder to the inside of the opening 41.

Figure 9 illustrates a modified form of dispenser similar in construction to that illustrated and described in connection with Figures 1 to 8 inclusive but being provided with a modified form of operating mechanism. In this form of the device a housing 3 has pivotally mounted therein on a stud or pin 43 one end of an arm 44 on the other end of which a yoke member 45 is formed. Connected to the yoke is one end of a lever or arm 46 the other end of which projects outwardly through a slot 4 in the housing 3. Integrally formed on the projecting end of the lever 46 is a push handle or finger piece 47. Mounted within the yoke member 45 is a gear segment or rack 48, having a gear 49 in mesh therewith. The gear 49 is supported on a sleeve 19 of a clutch member similar to the arrangement shown in Figure 2. Engaged around the stud or pin 43 is a control spring 50 one end of which is engaged against the inner surface of the housing 3 while the other end of the spring is engaged against one of the edges of the pivoted arm 44. The spring 50 acts to hold the lever 46 in its normal position ready to be operated by pushing the handle 46 toward the mounting plate 1 when it is desired to operate the dispenser. It will be noted that in the modified form of the dispenser illustrated in Figure 9 that the lever 46 is adapted to be pushed to cause operation of the dispenser while in the form of the device illustrated in Figures 1 to 8 the lever 5 as adapted to be pulled toward the operator.

The operation is as follows:

In the preferred embodiment of this invention referred to in Figures 1 to 8 inclusive, the dispenser is rigidly mounted in position upon a support or wall by securing the mounting plate 1 to the wall by means of screws 2 or other suitable means. To fill the dispenser the container 29 is removed from engagement with the supporting pins 28 by slightly rotating the container with respect to the cover or head 26. When the container is removed a stack of nested sundae dishes 30 is disposed within the container with the lowermost dish seated upon the ring 32 and projecting from the lower end of the container. The dishes immediately above the lowermost dish are disposed to contact the inclined ribs or flanges 33 provided in the lower end of the container. After the container has been filled the weight or follower 34 is seated in the uppermost dish within the container and serves as a means for feeding the stack of dishes downwardly by gravity through the container, each time a sundae dish is removed from the lower end thereof.

With the container filled as described the upper end of the container is projected into the cover 26 so that the bayonet slots 36 may be lockingly engaged on the pins 28 for the purpose of holding the container in operating position.

The spring 16 acts to normally hold the lever 5 in the position illustrated in Figure 6, ready for operation. When a soda fountain attendant desires to remove a sundae dish from the dispenser a dish holder 44 is taken hold of by the left hand of the person and the holder is moved into engagement with the lowermost sundae dish which projects from the dispenser container. With the holder in position the attendant or person uses their right hand to grip the knob or handle 6 and then pulls the lever 5 forwardly thereby causing the rack 17 to rotate the gear 18 which in turn acts on the clutch disc 20 and the bearing pins or rolls 23 to cause the drive to be imparted to the cover or head 26 on which the container 29 is supported. The container and the stack of sundae dishes therein are thus rotated as a unit with respect to the dish holder 40 which is held stationary by the attendant. Rotation of the container and the dishes causes the folded portion 31 of the lowermost dish to be slidably engaged behind the resilient tongue 42 provided within the holder. As this operation takes place the operator merely places the thumb of his left hand through the holder opening 41 into frictional contact with the folded portion of the dish and simultaneously withdraws the holder away from the lower end of the container. With this operation the lowermost dish remains seated in the holder while the rim of the dish is slightly flexed and passes through the retaining ring 32 positioned in the outlet of the container 29. As the lowermost dish is removed from the container the follower 34 acts automatically to cause the stack of sundae dishes to move downwardly in the container to position the next sundae dish in a proper position ready to be dispensed. The radial ribs or flanges 33 in the container act to restrict the movement of the stack of sundae dishes as the lowermost dish is being removed so that only one sundae dish is permitted to be removed at a time.

The improved method for dispensing sundae dishes from a container is very simple and as described merely requires a person to hold a dish holder stationary and in contact with the lowermost sundae dish during the time that the operator uses the right hand to pull the lever 5 toward the individual to cause the container and the entire stack of sundae dishes to be rotated with respect to the stationary sundae dish holder, in order that the folded portion of the lowermost sundae dish is moved into engagement behind the tongue of the dish holder so that the thumb of the person's left hand may be projected through the opening in the side of the dish holder to press the folded portion 31 of the lowermost dish against the outer surface of the tongue 42 to hold the lowermost sundae dish seated in position in the conical holder as the holder is moved away from the dispenser. The sundae dish within the holder may now be readily filled with ice cream and the like.

It will be noted that in dispensing sundae dishes according to the improved method just described that the sundae dishes dispensed are not touched by the attendant except at one place where the thumb of the attendant's left hand presses the folded portion of the dish against the tongue of the dish holder. The method is a sanitary one, insuring a proper dispensing of sundae dishes from the improved dispenser.

In the modified form of sundae dish dispenser illustrated in Figure 9 a sundae dish holder is engaged against the lowermost sundae dish and is held stationary by one hand of a person while the lever 46 is pushed away from the person by the other hand to cause the container and the dishes therein to be rotated with respect to the dish holder.

It will be noted that the improved device may be operated either by pulling or pushing a lever as preferred.

In case it is desired to omit the operating lever entirely, the container 29 may be provided with a corrugated rim 39 to permit the container to be rotated by gripping and turning the same with the right hand while the left hand is used to hold a sundae dish holder in contact with the lowermost sundae dish.

I am aware that many changes may be made, and numerous details of construction may be varied through a wide range without departing from the principles of this invention, and I therefore do not purpose limiting the patent granted hereon, otherwise than necessitated by the prior art.

I claim as my invention:

1. A dispenser comprising an apertured mounting plate, a housing secured thereto, a cover closing the lower end of said housing and rotatable with respect thereto, a sundae dish container removably engaged in said cover and adapted to carry a stack of nested sundae dishes, and a lever operated mechanism in said housing adapted to be operated to cause the cover, the container and the stack of dishes therein to be rotated as a unit, with respect to a sundae dish holder held in engagement with the lowermost dish in said container.

2. A dispenser comprising an apertured mounting plate, a slotted housing supported thereon, a cover rotatably supported on said housing, a sundae dish container removably engaged with said cover and adapted to carry a stack of nested sundae dishes, operating means mounted within said housing, and a lever mechanism for actuating said operating means to cause the cover and container together with the stack of sundae dishes to be rotated as a unit.

3. A dispenser comprising a stationary housing, a cover rotatably supported thereon enclosing one end thereof, a sundae dish container removably engaged in said cover and holding a stack of sundae dishes with the lowermost dish in the stack projecting from said container, and a lever operated mechanism within said housing connected to operate said cover and container to cause rotation thereof with respect to a stationary sundae dish holder held in contact with the lowermost sundae dish projecting from said container.

4. A dispenser comprising a stationary housing adapted to be mounted on a support, an operating mechanism in said housing, a lever for actuating the same, a cover for closing one end of said housing, means for rotatably supporting said cover on said housing, and a sundae dish container removably engaged in said cover.

5. A dispenser comprising a housing, a cover enclosing one end thereof, a clutch mechanism supported in said cover, a spring control gear mechanism coacting with said clutch mechanism, a lever for operating said gear mechanism, and a sundae dish container removably supported in said cover and rotatable therewith.

6. A dispenser comprising a housing, a sundae dish container rotatably suspended therefrom, and means within said housing for rotating the container with respect thereto to facilitate dispensing of sundae dishes from the container.

7. A dispenser comprising a support, a cover rotatably suspended therefrom, a container for sundae dishes removably engaged thereon, a follower in said container for feeding sundae dishes therethrough and means for causing rotation of the cover and container with respect to said housing to permit the lowermost sundae dish in the container to be moved into contact with a sundae dish holder and dispensed.

8. A dispenser comprising an apertured mounting plate, a slotted housing mounted thereon, a spring controlled gear segment pivotally mounted in said housing, a lever for operating the same, a gear in mesh with said gear segment, a clutch mechanism connected with said gear, a cover rotatably mounted on said housing and supporting said clutch mechanism, and a sundae dish container removably supported on said cover, said container being open at the lower end and having a plurality of inclined sundae dish retaining ribs radially positioned within the lower portion of said container.

9. A dispenser of the class described comprising a stationary housing, a support for mounting the same upon a wall, a cover rotatably supported on said housing, a clutch mechanism mounted in said cover, a sundae dish container removably supported in said cover, a gear supported in said housing, a yoke pivotally mounted in said housing, a rack carried by said yoke and meshing with said gear, and a lever connected with said yoke and projecting from said housing.

10. A dispenser comprising a mounting plate, a housing supported thereon, a cover rotatably mounted on said housing, a sundae dish container removably engaged with said cover, and means for rotating said container and cover as a unit with respect to said housing to facilitate dispensing of sundae dishes from said dispenser.

In testimony whereof I have hereunto subscribed my name.

CESARE BARBIERI.